March 4, 1930. W. A. PRUETT 1,749,227
COMPACT FLY AND TACKLE CASE
Filed April 3, 1926
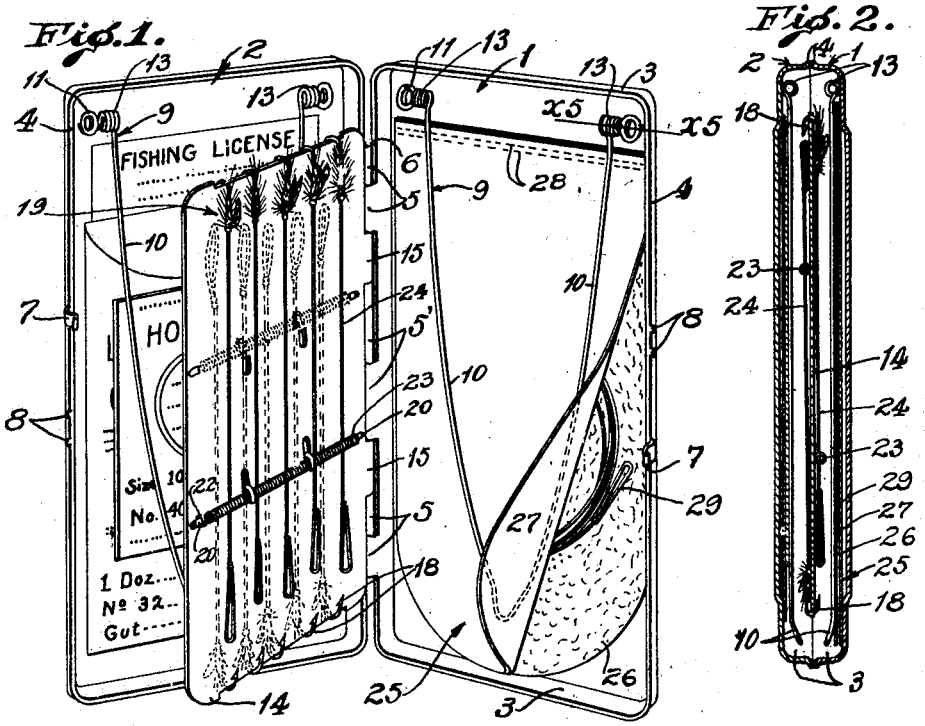
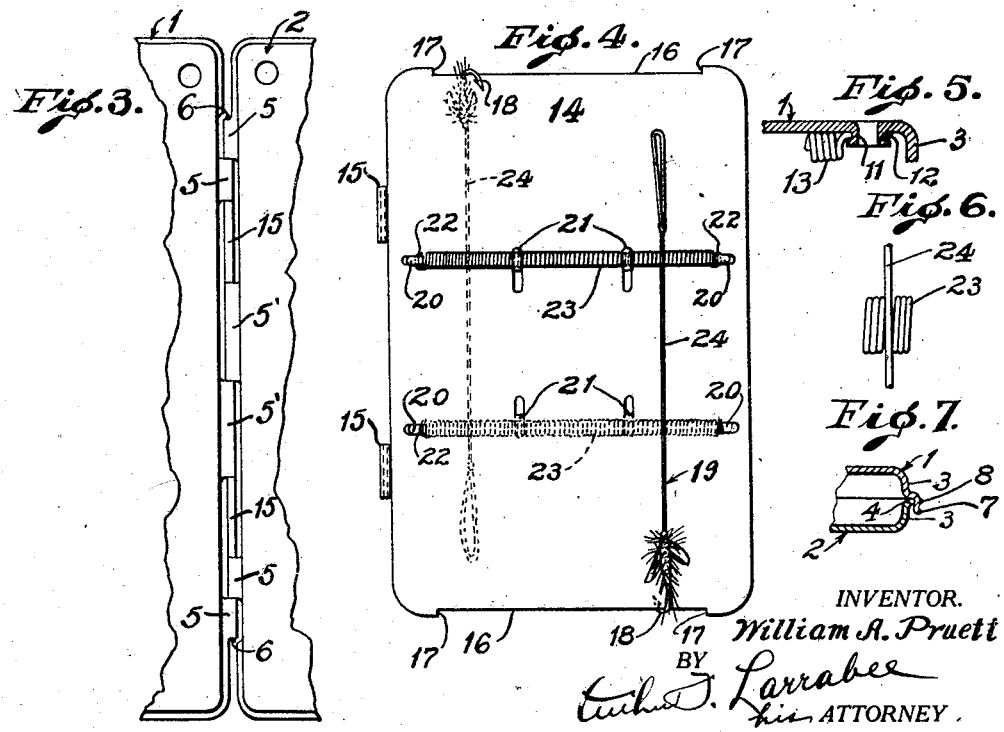
INVENTOR.
William A. Pruett
BY Larrabee
ATTORNEY.

Patented Mar. 4, 1930

1,749,227

UNITED STATES PATENT OFFICE

WILLIAM A. PRUETT, OF LOS ANGELES, CALIFORNIA

COMPACT FLY AND TACKLE CASE

Application filed April 3, 1926. Serial No. 99,601.

Heretofore sportsmen have been required to carry their fishing equipment, such as fly hooks, leaders, leader moisteners, license, etc., in separate containers, and an object of this invention is to provide a novel, simple, compact fly and tackle case which is adapted to receive all of the above articles and which will not be bulky, but can be conveniently carried in the sportsman's pocket.

An object is to provide in a device of this character, simple and compact means adapted to retain in the case and in accessible positions, various and sundry articles usually carried by sportsmen on fishing trips.

Another object is to provide novel means on which fly hooks may be easily and quickly mounted so that the snell of each hook will be held taut.

Another object is to provide in the device novel means for moistening gut leaders and maintaining the same in a moist condition, and which means will keep the moisture away from the fly hook mounting and carrying means.

Simplicity, cheapness, ease of assembly, manipulation and accessibility are other objects.

The invention resides in the parts and combinations of parts more particularly hereinafter referred to.

A feature of the invention resides in providing a single stamping to form a case cover member two of which are adapted to form the case by turning one member end for end relative to the other member and then hingedly connecting the said members together. A further feature is in the provision of novel means to prevent springing of the case members when opening or closing the case.

Other objects, advantages and features of invention may appear from the accompanying drawing, the subjoined detail description and the appended claims.

The accompanying drawing illustrates the invention in the form I at present deem preferable.

Figure 1 is a perspective view showing my device in opened position to disclose interior construction.

Fig. 2 is a longitudinal sectional view showing the case in closed position.

Fig. 3 is a fragmental view on enlarged scale showing the manner of hinging the case covers and the leaf on which are mounted the fly hooks.

Fig. 4 is a side view of the fly hook mounting leaf and associated parts with a fly hook mounted on opposite sides of the leaf.

Fig. 5 is a fragmental section on line $x5$, Fig. 1, showing the manner of attaching the resilient clamp members to the case covers.

Fig. 6 is a more or less diagrammatic view fragmentally illustrating a fly hook snell secured in the snell fastening means.

Fig. 7 is a fragmental sectional view of the closed case with fly leaf removed showing the case closure means.

In carrying out my invention I provide case members or covers 1, 2 that are each provided with side walls 3 around which extends an outwardly flaring bead 4. Projections 5, 5' formed integral with the bead 4 extend therefrom near each end and at one side of the middle of said covers and said projections 5, 5' are bent to form a journal box to receive a pin 6 that forms a means whereby said case covers are hinged to each other about a common axis. The free longitudinal edges of said covers are provided with spring clasps 7 and also in spaced relation thereto are protrusions 8. The clasps 7 are adapted to engage the bead 4 and hold the case covers in closed position. The clasp 7 of one member is adapted to be received between the protrusions 8 on the correlative case member of the device and such protrusions 8 serve to prevent the case members from springing to one side when closing and opening the case and thereby add to the rigidity of the case when closed without adding to the cost of manufacture.

The walls 3 of the covers 1, 2 provide the requisite depth for the case and said covers are preferably made from sheet metal stampings that are so drawn as to form a cover from a single blank and said covers are so constructed that any two covers will make the case by merely reversing one of the covers end for end relative to the other cover and hinging the same together.

Secured to one end of the inside of each cover is a resilient clamp member 9 comprising arms 10 that extend nearly the entire length of the case. The arms 10 are connected together at one end and are spread at their other ends to form a substantial V-shaped clamp, the arms of which are secured at their other ends to the case covers by any suitable means such as by a grommet 11 struck up from the covers and which is burred over an eye 12 formed at one end of a coil 13 that is formed in one end of each of the arms 10 and which coil normally holds the clamp members 9 against the case cover to which it is secured.

A fly leaf 14 of sheet metal has projections 15 bent to receive pin 6 to which it is pivoted. The projections 15 are adapted to fill the space between the projections 5, 5' so as to complete the hinge assembly and present a neat device when the case is closed. The ends of the leaf 14 are notched or cut out so as to provide recesses as at 16 and the ends 17 of the notched portion 16 are in the form of projections that provide stops to prevent the hook 18 of the fly hooks 19 from accidentally sliding off from the leaf 14 when mounted thereon. Hook members 20, 21 are struck up from opposite sides of the leaf 14 and the hooks 20 provide means to which the eyes 22 of extension springs 23 may be attached. The members 21 hold in a straight line the springs 23 that are secured to the hook members 20, 21 and transversely of the leaf 14. The hook members 21 prevent bowing of the springs when the snells 24 of the fly hooks 19 are drawn taut and pressed between windings of the spring.

Preferably the spring securing means are placed on the leaf 14 and spaced from one end thereof a distance that is equal to about one third of the length of said leaf, and by placing such means on opposite sides of the leaf 14 and nearest opposite ends thereof I provide a compact leaf adapted to receive a maximum number of fly hooks 19 and which number will not be limited by a number of scallops formed in a catch member as heretofore used.

A leader moistener 25 comprising a felt 26 having a rubber or other water proof sheet 27 stitched or otherwise secured thereto at one end as at 28 is provided to maintain in a moist condition the leaders 29 that are adapted to be inserted between the rubber and felt strip which is moistened as desired to afford the proper degree of moisture for the leaders. The moistener 25 is preferably of such size as to practically cover the entire side of the case as shown in Fig. 1.

In practice I preferably mount the resilient clamp members 9 on the same end of the completed case as shown in Fig. 1 and the leader moistener 25 is inserted under one of the clamp members 9 so that the rubber sheet 27 is nearest the fly leaf 14 and thereby protect any fly hooks 19 mounted thereon from contact with the moistened felt and thus maintains such fly hooks 19 in a dry state. The other clamp member 9 may be used to retain in the case various articles such as a fishing license, packages of hooks, etc.

The use and compactness of the device will be apparent from the foregoing.

An advantage is that after placing tackle in position in the case, the case may be opened up and turned upside down or otherwise accidentally opened without danger or likelihood of losing or spilling the tackle mounted therein.

I claim:

1. In a device of the character set forth comprising a hinged fly leaf the ends of which are provided with cut-away portions to provide recesses; hook members struck up from opposite sides of the leaf; springs secured to said hook members; and other hook members adapted to prevent bowing of said springs.

2. In a device of the character set forth comprising a hinged fly leaf the ends of which are adapted to have the hooks of fishing hooks hooked thereover; hook members struck up from opposite sides of the leaf; springs secured to said hook members; and other hook members adapted to prevent material bowing of said springs when a hook is hooked over the end of said fly leaf and the snell of said hook received between the coils of said springs.

3. In a device of the character set forth comprising a fly leaf the ends of which are notched; hook members extending from opposite sides of said fly leaf; and coil springs having eyes attached to said hooks and in which springs may be inserted the snells of fly hooks mounted on said fly leaf.

4. A device of the character described comprising a pair of case members, a fly leaf, said case members and said fly leaf being hinged together at one edge, a leader moistener comprising a sheet of felt and a sheet of rubber for covering said sheet of felt, said sheet of felt being secured in the inside of, and adjacent one of said case members.

5. A device of the character described comprising a pair of case members, a fly leaf, said case members and said fly leaf being hinged together at one edge, a leader moistener comprising a sheet of felt and a sheet of rubber for covering said sheet of felt, said sheet of felt being secured in the inside of, and adjacent one of said case members, and said sheet of rubber being secured only at one end to said sheet of felt.

6. A device of the character described comprising a pair of case members, a fly leaf, said case members and said fly leaf being hinged together at one edge, a leader moistener comprising a sheet of felt and a sheet of rubber for covering said sheet of felt, said sheet of felt being secured in the inside of, and adjacent one of said case members, and a clamp for clamping said rubber sheet in covering position on said sheet of felt.

In testimony whereof I have hereunto set my hand at Los Angeles, California, this 24th day of March, 1926.

WILLIAM A. PRUETT.